(12) United States Patent
Lee et al.

(10) Patent No.: US 10,942,667 B2
(45) Date of Patent: Mar. 9, 2021

(54) STORAGE DEVICE HAVING VARIABLE ERASE UNIT SIZE AND STORAGE SYSTEM INCLUDING THE SAME

(71) Applicant: SAMSUNG ELECTRONICS CO., LTD., Suwon-si (KR)

(72) Inventors: Ju-Pyung Lee, Incheon (KR); Jee-Seok Hyun, Hwaseong-si (KR); Hye-Sung Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 821 days.

(21) Appl. No.: 15/458,058

(22) Filed: Mar. 14, 2017

(65) Prior Publication Data

US 2018/0081588 A1  Mar. 22, 2018

(30) Foreign Application Priority Data

Sep. 22, 2016 (KR) .................. 10-2016-0121455

(51) Int. Cl.
*G06F 12/00* (2006.01)
*G06F 3/06* (2006.01)

(52) U.S. Cl.
CPC ............ *G06F 3/0652* (2013.01); *G06F 3/061* (2013.01); *G06F 3/064* (2013.01); *G06F 3/0619* (2013.01); *G06F 3/0688* (2013.01)

(58) Field of Classification Search
CPC .... G06F 11/1076; G06F 3/064; G06F 3/0689; G06F 12/0246; G06F 11/108
See application file for complete search history.

(56) References Cited

U.S. PATENT DOCUMENTS

| | | | |
|---|---|---|---|
| 8,621,145 B1* | 12/2013 | Kimmel | G06F 12/0246 711/103 |
| 8,713,268 B2 | 4/2014 | Dillow et al. | |
| 8,751,755 B2 | 6/2014 | Prins et al. | |
| 8,850,133 B1 | 9/2014 | Mandic et al. | |
| 9,043,572 B2 | 5/2015 | Benhase et al. | |
| 9,152,555 B2 | 10/2015 | Higgins et al. | |
| 9,239,786 B2 | 1/2016 | Ki et al. | |
| 2002/0091903 A1* | 7/2002 | Mizuno | G06F 3/0605 711/154 |
| 2003/0120869 A1* | 6/2003 | Lee | G06F 11/1084 711/135 |
| 2007/0038802 A1* | 2/2007 | Tsai | G06F 12/0246 711/103 |
| 2007/0208790 A1* | 9/2007 | Reuter | G06F 12/0253 |
| 2009/0083476 A1 | 3/2009 | Pua et al. | |
| 2011/0188311 A1* | 8/2011 | Stiegler | G11C 7/02 365/185.13 |
| 2013/0166825 A1* | 6/2013 | Kim | G06F 12/0246 711/103 |
| 2013/0262920 A1* | 10/2013 | Jung | G06F 11/1076 714/6.22 |
| 2014/0380092 A1 | 12/2014 | Kim et al. | |
| 2017/0123995 A1* | 5/2017 | Freyensee | G06F 12/10 |

* cited by examiner

*Primary Examiner* — Jason W Blust
(74) *Attorney, Agent, or Firm* — Volentine, Whitt & Francos, PLLC

(57) ABSTRACT

A redundant array of independent disks (RAID) storage system includes a plurality of storage devices that perform an erase operation according to a plurality of erase unit sizes. A RAID controller controls the plurality of storage devices based on a RAID environment. The RAID controller adjusts the erase unit sizes with respect to at least some of the plurality of storage devices, respectively.

18 Claims, 15 Drawing Sheets

| ERASE UNIT SIZE (MB) | WRITE THROUGHPUT (MB/s) |
|---|---|
| 64 | 30 |
| 128 | 60 |
| 256 | 120 |
| 512 | 240 |

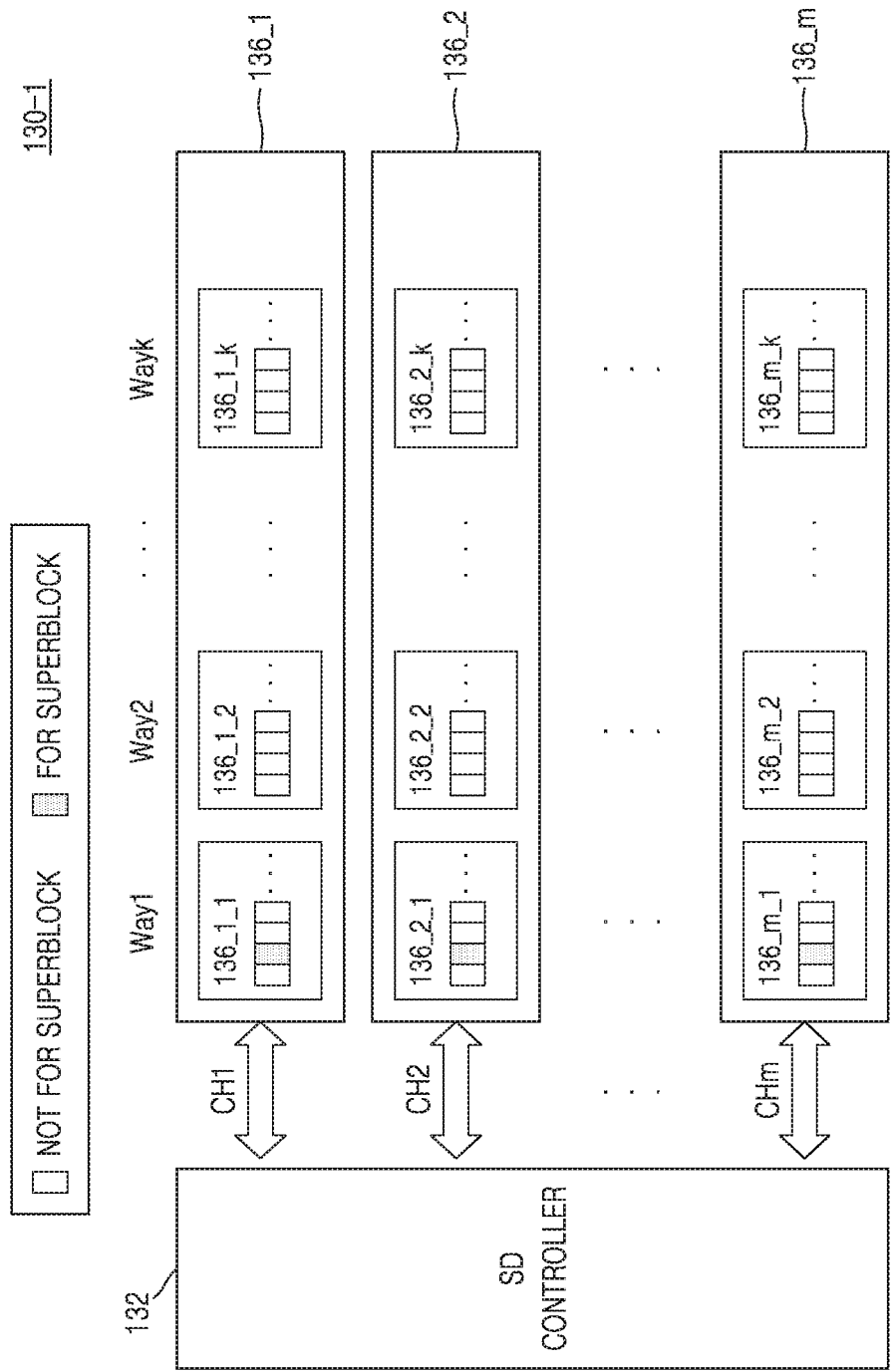

STORAGE DEVICE HAVING VARIABLE ERASE UNIT SIZE AND STORAGE SYSTEM INCLUDING THE SAME

CROSS-REFERENCE TO RELATED APPLICATION

This application claims the benefit of Korean Patent Application No. 10-2016-0121455, filed on Sep. 22, 2016, in the Korean Intellectual Property Office, the disclosure of which is incorporated herein in its entirety by reference.

BACKGROUND

The disclosure relates to a storage system, and more particularly, to a redundant array of independent disks (RAID) storage system including a storage device having a variable erase unit size.

RAID is a technique of dispersing and storing data in a plurality of disk devices. A plurality of independent disks looks as a single disk in a host system, and thus, a mass storage device may be realized and a data input/output speed may also be improved as a data input/output operation corresponding to each of the disks is simultaneously performed. Furthermore, parity data corresponding to data stored in each of the disks is stored with the data. Therefore, even when a physical error occurs in some of the disks, damaged data may be automatically recovered by the parity data, and thus, data stability may be improved.

Meanwhile, a storage system applying RAID requires research into reducing a load due to a host system and a Write Amplification Factor (WAF).

SUMMARY

The disclosure describes a redundant array of independent disks (RAID) storage system capable of adjusting an erase unit size of each storage device based on a RAID environment.

The disclosure also describes a storage device capable of resetting an erase unit size according to an input from a RAID controller.

According to an aspect of the disclosure, there is provided a RAID storage system including a plurality of storage devices configured to perform an erase operation according to each of a plurality of erase unit sizes. A RAID controller controls the plurality of storage devices based on a RAID environment. The RAID controller adjusts the erase unit sizes with respect to at least some of the plurality of storage devices, respectively.

According to another aspect of the disclosure, there is provided a storage device controlled by a RAID controller including a device controller and a plurality of memory devices connected to the device controller through at least one channel. The device controller resets an erase unit size of the storage device according to an input from the RAID controller.

According to another aspect of the disclosure, there is provided a RAID storage system that includes a plurality of storage devices that erase an amount of stored data identified by a received erase-unit size. A RAID controller determines the erase-unit size based upon performance information of the storage devices, which is received from one of the storage devices, and communicates the erase-unit size to the storage devices.

BRIEF DESCRIPTION OF THE DRAWINGS

Embodiments of the disclosure will be more clearly understood from the following detailed description taken in conjunction with the accompanying drawings in which:

FIGS. 6A and 6B are views illustrating a reset operation of an erase unit size with respect to the storage device of FIG. 5, according to an example embodiment of the disclosure;

DETAILED DESCRIPTION OF THE EMBODIMENTS

Figure 1:
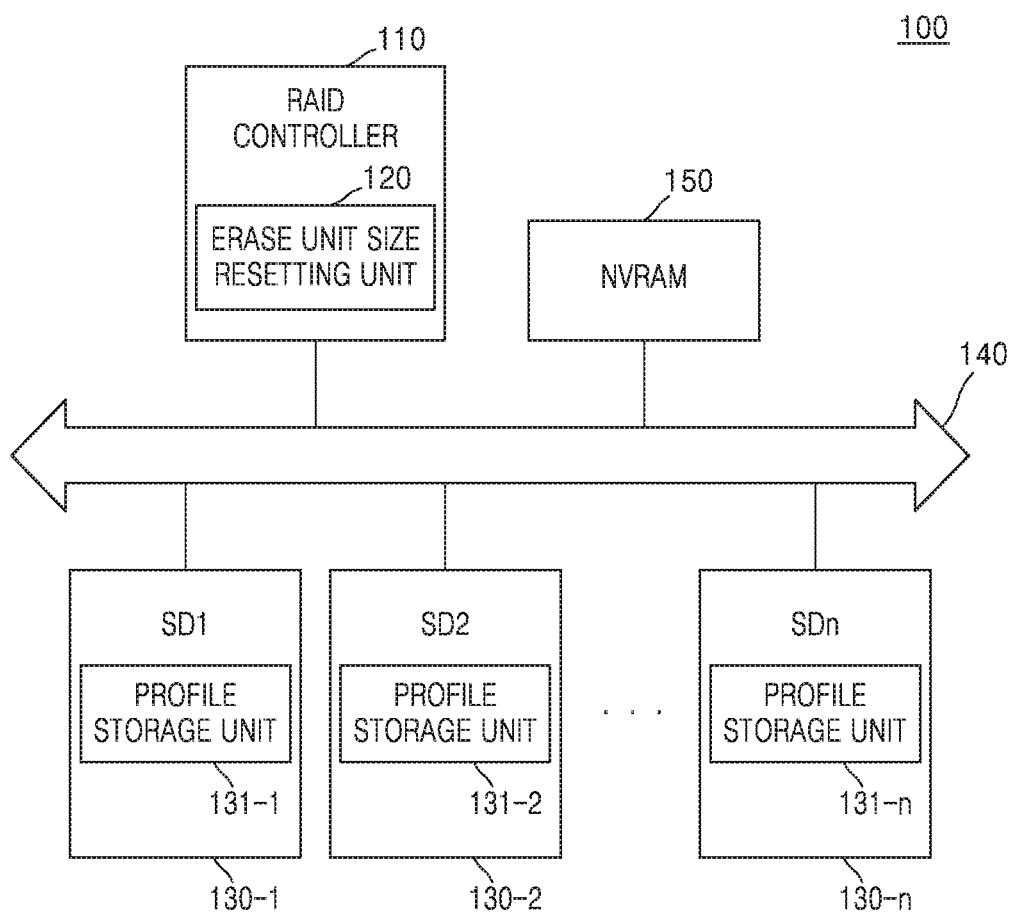
FIG. 1 is a view illustrating a configuration of a redundant array of independent disks (RAID) storage system, according to an example embodiment of the disclosure.

FIG. 1 is a view illustrating a configuration of a redundant array of independent disks (RAID) storage system, according to an example embodiment of the disclosure.

Referring to FIG. 1, a RAID storage system 100 may include a RAID controller 110, a nonvolatile random access memory (NVRAM) 150, a plurality of storage devices SD1 130-1 through SDn 130-$n$, and a bus 140. Components of the RAID storage system 100 may be connected to each other to communicate with each other through the bus 140.

A RAID method may include, to prevent data loss when some storage devices are broken, a method of restoring data by using a mirroring-based technique, and a method of restoring data by using a parity-based technique. For example, a parity-based RAID method may be applied to the RAID storage system 100.

The storage devices 130-1 through 130-n may store various kinds of data, and may be realized by a solid state drive, an embedded multimedia card (eMMC), or a universal flash storage. In the present example embodiment, the storage devices 130-1 through 130-n may be realized by solid state drives. The solid state drives may realize the storage devices 130-1 through 130-n by using a plurality of nonvolatile memory chips. In an example embodiment, solid state drives may realize storage devices by using a plurality of flash memory chips.

The storage devices 130-1 through 130-n may include profile storage units 131-1 through 131-n, respectively. Each of the profile storage units 131-1 through 131-n may store a profile of each of the storage devices 130-1 through 130-n. The profile may be, for example, correlation information between an erase unit size of each of the storage devices 130-1 through 130-n and the read or write performance of a device-level of each of the storage devices 130-1 through 130-n. In an example embodiment, the profile storage units 131-1 through 131-n may be included in memory chips forming the storage devices 130-1 through 130-n. However, the disclosure is not limited thereto.

The storage devices 130-1 through 130-n, in response to a request of the RAID controller 110, may provide a profile of each of the storage devices 130-1 through 130-n stored in the profile storage units 131-1 through 131-n to the RAID controller 110. Each of the storage devices 130-1 through 130-n may reset its erase unit size by the RAID controller 110.

The NVRAM 150 may be RAM in which stored data remains even after power is turned off. In an example embodiment, the NVRAM 150 may be realized by phase change RAM (PRAM), ferroelectric RAM (FRAM), or magnetic RAM (MRAM). In another example embodiment, the NVRAM 150 may also realize power applied to dynamic random access memory (DRAM) or static RAM (SRAM) that are volatile memories, by using a battery or a capacitor. For example, when system power is turned off, DRAM or SRAM is operated by a battery or a capacitor and data stored in the DRAM or SRAM is shifted to a storage device that is a nonvolatile storage space, and thus, data may be maintained. Therefore, data stored in DRAM or SRAM may be maintained even if system power is turned off.

A cache area, in which data to be written in the plurality of storage devices 130-1 through 130-n for each stripe unit is stored, may be allocated in the NVRAM 150. The cache area allocated in the NVRAM 150 to store the data to be written in the plurality of storage devices 130-1 through 130-n for each stripe unit may be referred to as a stripe-cache area.

The NVRAM 150 may store mapping table information used in the RAID storage system 100. The mapping table information may include address mapping table information converting a logical address into a physical address and/or stripe mapping table information indicating stripe grouping information. The stripe grouping information may include memory blocks forming stripes, respectively. The stripe mapping table information may also include valid page ratio information corresponding to each stripe.

The address mapping table information may include a physical address of each of the storage devices 130-1 through 130-n corresponding to a logical address. In an example embodiment, the address mapping table information may include the number of each of the storage devices 130-1 through 130-n corresponding to a logical address and physical addresses of the corresponding storage devices 130-1 through 130-n.

The RAID controller 110 may control the plurality of storage devices 130-1 through 130-n based on a RAID environment. In an example embodiment, the RAID environment may be a log-structured RAID environment. In the log-structured RAID environment, the RAID controller 110, when updating data written in the storage devices 130-1 through 130-n, may control the RAID storage system 100 to write data in a new location in a log form without overwriting data. A plurality of memory blocks written in a log form and a memory block storing parity information about data stored in the plurality of memory blocks may form a stripe. This will be described later below in detail with reference to FIG. 2A.

The RAID controller 110 may perform an operation of registering pieces of memory block position information of the storage devices 130-1 through 130-n forming a stripe in a stripe mapping table.

The RAID controller 110 may perform an address conversion process and/or a stripe grouping process by using mapping table information stored in the NVRAM 150. For example, the RAID controller 110 may convert a logical address into a physical address by using address mapping table information. The RAID controller 110 may perform garbage collection for each stripe unit by using stripe mapping table information.

The RAID controller 110 may perform an operation of selecting a victim stripe for garbage collection by using mapping table information. For example, the RAID controller 110 may find a stripe with the lowest valid page ratio from among grouped stripes by using stripe mapping table information, and may select the stripe as a victim stripe.

The RAID controller 110 may include an erase unit size resetting unit 120 capable of adjusting erase unit sizes of at least some of the storage devices 130-1 through 130-n. The erase unit size resetting unit 120 may receive information about the request of a user and the number and/or profiles of the storage devices 130-1 through 130-n, and may adjust erase unit sizes of the storage devices 130-1 through 130-n based thereon. The profiles of the storage devices 130-1 through 130-n may be received from the storage devices 130-1 through 130-n, respectively. For example, the erase unit size resetting unit 120, after deriving a performance value requiring a device-level based on the information about the request of a user and the number of storage devices 130-1 through 130-n, may derive erase unit sizes of the storage devices 130-1 through 130-n to be reset by comparing the performance value requiring a device-level with the profiles of the storage devices 130-1 through 130-n.

Figure 2A:
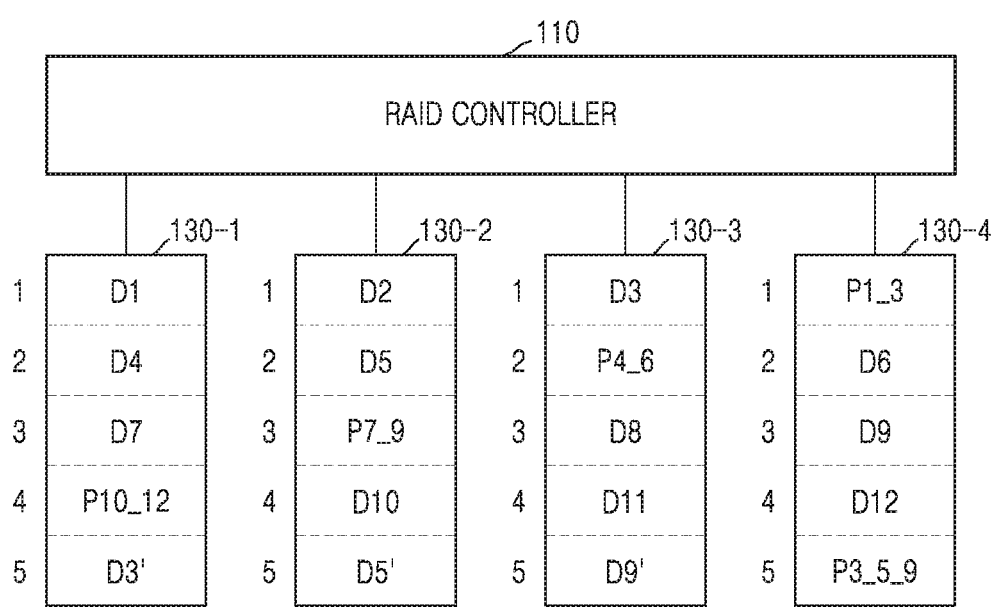
FIGS. 2A and 2B are views illustrating a RAID environment of a RAID storage system, according to an example embodiment of the disclosure.
Figure 2B:
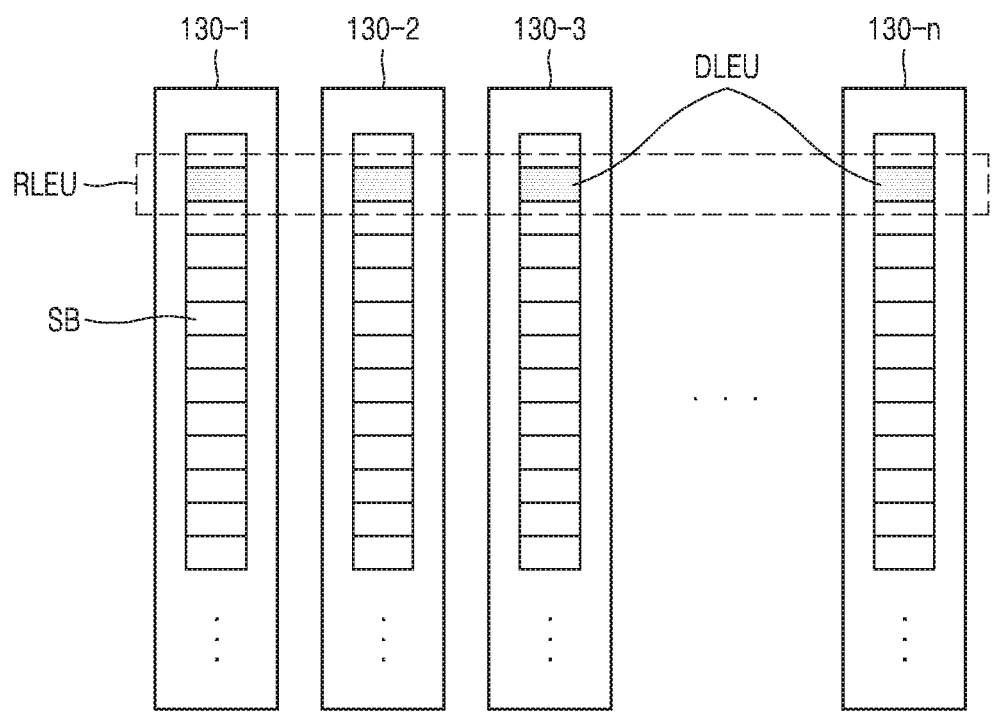

FIGS. 2A and 2B are views illustrating a RAID environment of a RAID storage system, according to an example embodiment of the disclosure. In detail, FIG. 2A is a conceptual diagram illustrating a log-structured RAID technique, and FIG. 2B is a conceptual diagram illustrating matching between an erase unit of a RAID-level and an erase unit of a device-level in a log-structured RAID environment.

FIG. 2A shows the RAID controller 110 and the first to fourth storage devices 130-1 to 130-4 of FIG. 1, and data and parity information are stored in first to fourth addresses of each of the first to fourth storage devices 130-1 to 130-4 to which parity-based RAID 5 is applied. However, the illustrated example embodiment is only for convenience of explanation and the disclosure is not limited thereto.

It is assumed that each of data D3, D5, and D9 is sequentially updated to each of D3', D5', and D9' in a state of storing data in the first to fourth addresses of each of the first to fourth storage devices 130-1 to 130-4. Here, the new data D3' is written in a new location that is in a fifth address of the first storage device 130-1 without being updated in the first address of the third storage device 130-3 in which the data D3 is already written. Furthermore, the new data D5' and D9' are also written in a new position in a log form without being overwritten by the same method. When the write operation of D3', D5' and D9' forming a stripe is completed, parity information P3_5_9 about data forming the same stripe is written in a fifth address of the fourth storage device 130-4. When the update process according to the log-structured RAID technique is completed, updated data and parity information may be stored in the first to fourth storage devices 130-1 to 130-4, as illustrated in FIG. 2A.

In the log-structured RAID environment, garbage collection may be performed in each of the RAID-level and the device-level. The garbage collection in the RAID-level may be necessary to newly ensure a logical empty space for a new write operation, and the garbage collection in the device-level may be necessary to newly ensure a physical empty space by erasing a memory block of a flash memory chip for a new write operation. In the log-structured RAID environment, the entire write amplification factor (WAF) may be greater when the garbage collection in the RAID-level and the garbage collection in the device-level are performed separately. Therefore, matching between an erase unit of the RAID-level and an erase unit of the device-level may be necessary in the log-structured RAID environment.

FIG. 2B shows the matching between the erase unit of the RAID-level and the erase unit of the device-level in the log-structured RAID environment.

Referring to FIG. 2B, the storage devices 130-1 through 130-n of FIG. 1 may include a plurality of super blocks SB. The super blocks SB may be a group of one or more memory blocks included in each memory chip (not shown) to/from which data is input/output through identical channels. When data is input or output in parallel through a greater number of memory chips (not shown), the read or write performance of each of the storage devices 130-1 through 130-n may be improved and the sizes of the super blocks SB may increase.

In a RAID environment, an erase unit DLEU of a device-level of each of the storage devices 130-1 through 130-n may include at least one of the super blocks SB. In an RAID environment, an erase unit RLEU of a RAID-level of the RAID storage system 100 (see FIG. 1) may include the erase unit DLEU of the device-level.

Therefore, separate garbage collection of a device-level may not be necessary when garbage collection of a RAID-level is performed. However, when the erase unit DLEU of the device-level is included in the erase unit RLEU of the RAID-level, a size of the erase unit DLEU of the device-level increases and thus a size of the erase unit RLEU of the RAID-level is also larger. Therefore, the erase unit DLEU of the device-level and the erase unit RLEU of the RAID-level may lay a burden on a host (not shown) and cause an increase in a WAF.

The RAID storage system 100 according to an example embodiment of the disclosure may reduce a burden on a host (not shown) by optimally resetting an erase unit size of each of the storage devices 130-1 through 130-n in a RAID environment, and may improve the I/O performance and lifetime of each of the storage devices 130-1 through 130-n by reducing a WAF.

Figures 3, 4:
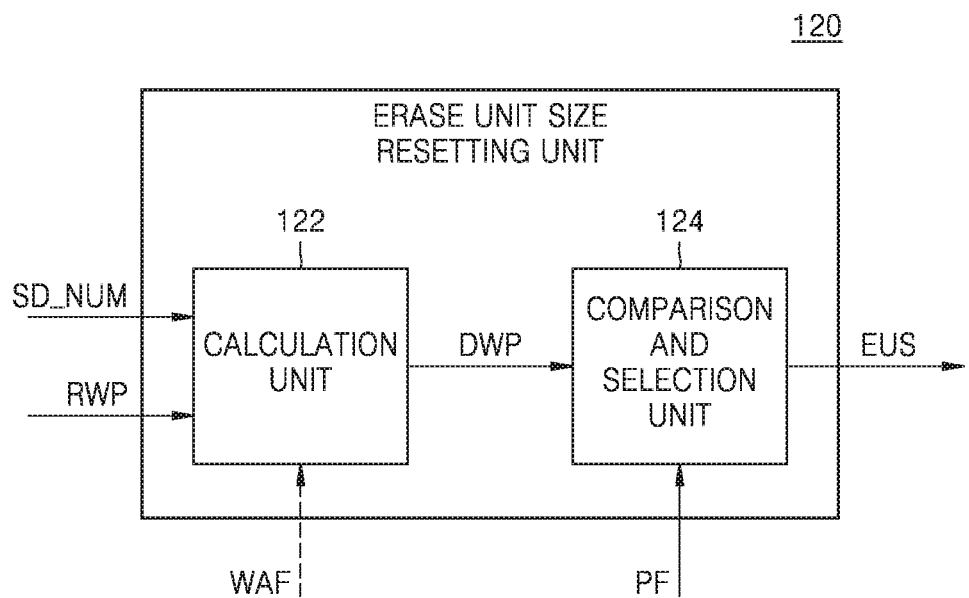
FIG. 3 is a block diagram illustrating a configuration of an erase unit size resetting unit of FIG. 1, according to an example embodiment of the disclosure.
FIG. 4 is a view of a profile provided from storage devices, according to an example embodiment of the disclosure.

FIG. 3 is a block diagram illustrating a configuration of the erase unit size resetting unit 120 of FIG. 1, according to an example embodiment of the disclosure.

Referring to FIGS. 1 and 3, the erase unit size resetting unit 120 included in the RAID controller 110 may include a calculation unit 122 and a comparison and selection unit 124.

The calculation unit 122 may derive a performance value DWP requiring a device-level by receiving the number SD_NUM of storage devices 130-1 through 130-n and information RWP about the request of a user, and may output the performance value DWP requiring a device-level to the comparison and selection unit 124. The number SD_NUM of the storage devices 130-1 through 130-n may be a value stored in the RAID storage system 100 or a value received from outside of the RAID storage system 100. The information RWP about the request of a user may be received from a host (not shown). In an example embodiment, the information RWP about the request of a user may include the read or write performance of a RAID-level.

The calculation unit 122, when the information RWP about the request of a user includes read or write performance of a RAID-level, may generate the performance value DWP requiring a device-level by dividing the read or write performance of the RAID-level by the number SD_NUM of the storage devices 130-1 through 130-n. For example, when the information RWP about the request of a user is the write performance of a RAID-level of 1,000 MB/s and the number SD_NUM of the storage devices 130-1 through 130-n is 20, the calculation unit 122 may generate 1,000/20=50 MB/s as the performance value DWP requiring a device-level.

In another example embodiment, the calculation unit 122 may derive the performance value DWP requiring a device-level further based on a WAF of a RAID-level as well as the number SD_NUM of the storage devices 130-1 through 130-n and the information RWP about the request of a user. By further considering the WAF of the RAID-level, the performance value DWP requiring a device-level may be derived by further considering a generation of garbage collection of a RAID-level. As in the above example embodiment, when the information RWP about the request of a user is the write performance of a RAID-level of 1,000 MB/s and the number SD_NUM of the storage devices 130-1 through 130-n is 20, the calculation unit 122 may generate (1,000/20)*2.0=100 MB/s as the performance value DWP requiring a device-level when the WAF of the RAID-level is predicted to be 2.0.

The comparison and selection unit 124 receives the performance value DWP requiring a device-level from the calculation unit 122 and a profile PF from each of the storage devices 130-1 through 130-n, and may select an erase unit size EUS to be reset by comparing the received performance value DWP requiring a device-level with the received profile PF and may output the selected erase unit size EUS to be reset to each of the storage devices 130-1 through 130-n. In an example embodiment, the comparison and selection unit 124 may include the erase unit size EUS to be reset in a vendor command, and may output the erase unit size EUS to be reset to each of the storage devices 130-1 through 130-n.

In an example embodiment, the profile PF received from each of the storage devices 130-1 through 130-n may include correlation information between an erase unit size of a device-level of each of the storage devices 130-1 through 130-n and the read or write performance of a device-level. An operation of the comparison and selection unit 124 will be described with reference to FIG. 4.

FIG. 4 is a view of a profile provided from storage devices, according to an example embodiment of the disclosure.

In more detail, FIG. 4 shows a table of a profile PF received from each of the storage devices 130-1 through 130-n, wherein the profile PF is correlation information between an erase unit size of a device-level of each of the storage devices 130-1 through 130-n and the write performance of the device-level. Both the erase unit size of the device-level and the write performance of the device-level may be proportional to the number of memory chips involved in forming super blocks. Therefore, as the erase unit size of the device-level increases, the corresponding write performance of the device-level may also be improved. FIG. 4 shows numbers as an example of an erase unit size of a device-level and the write performance of the device-level. However, the illustrated example embodiment is only for convenience of explanation and the disclosure is not limited thereto.

Referring to FIGS. 3 and 4, for example, the comparison and selection unit 124 may receive the performance value DWP requiring a device-level from the calculation unit 122 and may compare the performance value DWP requiring a device-level with the write performance of the device-level received from each of the storage devices 130-1 through 130-n. When the performance value DWP requiring a device-level is 50 MB/s according to the above example embodiment, the write performance of a device-level satisfying the performance value DWP requiring a device-level may be 60 MB/s, 120 MB/s, and 240 MB/s when comparing the performance value DWP requiring a device-level of 50 MB/s with the write performance of a device-level received from each of the storage devices 130-1 through 130-n. The comparison and selection unit 124 may select the write performance of a device-level satisfying the performance value DWP requiring a device-level and having a minimum corresponding erase unit size of a device-level. Referring to FIG. 4, the minimum erase unit size of a device-level may be 128 MB among the erase unit sizes of a device-level corresponding to the write performances of a device-level that satisfying the performance value DWP requiring a device-level. Therefore, the comparison and selection unit 124 may select an erase unit size of a device-level of 128 MB corresponding to the write performance of the device-level of 60 MB/s as the erase unit size EUS to be reset, and may output the erase unit size of a device-level of 128 MB to each of the storage devices 130-1 through 130-n.

In another example embodiment, as described above, when the calculation unit 122 derives the performance value DWP requiring a device-level of 100 MB/s further based on a WAF of a RAID-level, the write performance of a device-level satisfying the performance value DWP requiring a device-level may be 120 MB/s and 240 MB/s compared to the write performance of a device-level received from the comparison and selection unit 124. Therefore, the comparison and selection unit 124 may select 256 MB that is a minimum erase unit size of a device-level corresponding to the write performance of the device-level of 120 MB/s as the erase unit size EUS to be reset, and may output the erase unit size EUS to be reset to each of the storage devices 130-1 through 130-n.

Figure 5:
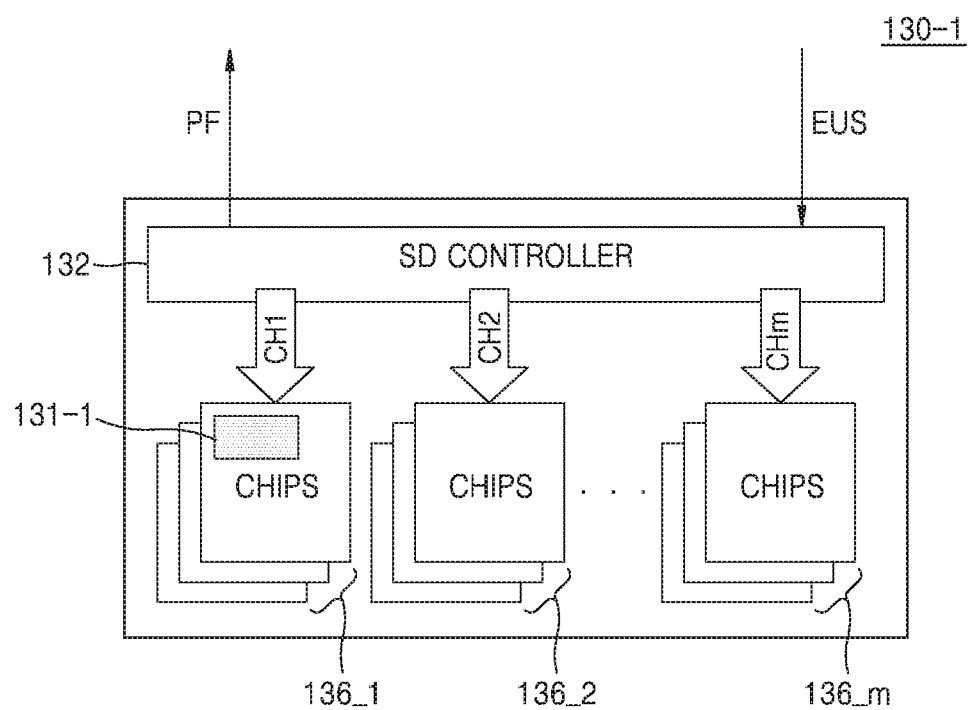
FIG. 5 is a block diagram illustrating a configuration of a storage device of FIG. 1, according to an example embodiment of the disclosure.

FIG. 5 is a block diagram illustrating a configuration of the storage device 130-1 from among the storage devices 130-1 through 130-n of FIG. 1, according to an example embodiment of the disclosure.

Referring to FIGS. 1 and 5, the storage device 130-1 may include a secure digital (SD) controller 132 and memory chips 136_1 through 136_m of first through mth groups.

The SD controller 132 may control the memory chips 136_1 through 136_m of the first through mth groups based on a command received from outside of the storage device 130-1. The SD controller 132, by providing an address, a command, and a control signal through a plurality of channels CH1 through CHm, may control write, read, and erase operations on the memory chips 136_1 through 136_m of the first through mth groups.

The SD controller 132 may output a profile PF of the storage device 130-1 to the RAID controller 110. In an example embodiment, the profile PF may be stored in a profile storage unit 131-1 included in at least one memory chip from among the memory chips 136_1 through 136_m of the first through mth groups. The profile PF stored in the profile storage unit 131-1 may include correlation information between an erase unit size of a device-level of the storage device 130-1 and the read or write performance of the device-level. In an example embodiment, the SD controller 132 may include the profile PF of the storage devices 130-1 in a vendor command, and may output the profile PF to the RAID controller 110.

The SD controller 132 may receive the erase unit size EUS to be reset from the RAID controller 110, and may reset an erase unit size of the storage device 130-1 based thereon. In an example embodiment, an erase unit size of the storage device 130-1 may be reset by adjusting sizes of super blocks included in the storage device 130-1.

The memory chips 136_1 through 136_m of the first through mth groups may be flash memory chips including at least one memory block. However, the disclosure is not limited thereto. In another example embodiment, the memory chips 136_1 through 136_m of the first through mth groups, as a non-limiting example, may be PRAM chips, FRAM chips, or MRAM chips that are nonvolatile memories. Furthermore, FIG. 5 shows an example of the storage device 130-1 having m (m is a natural number) channels CH1 through CHm and including three memory chips per channel. However, the illustrated example embodiment is only for convenience of explanation and the number of memory chips per channel may vary.

Figure 6A:
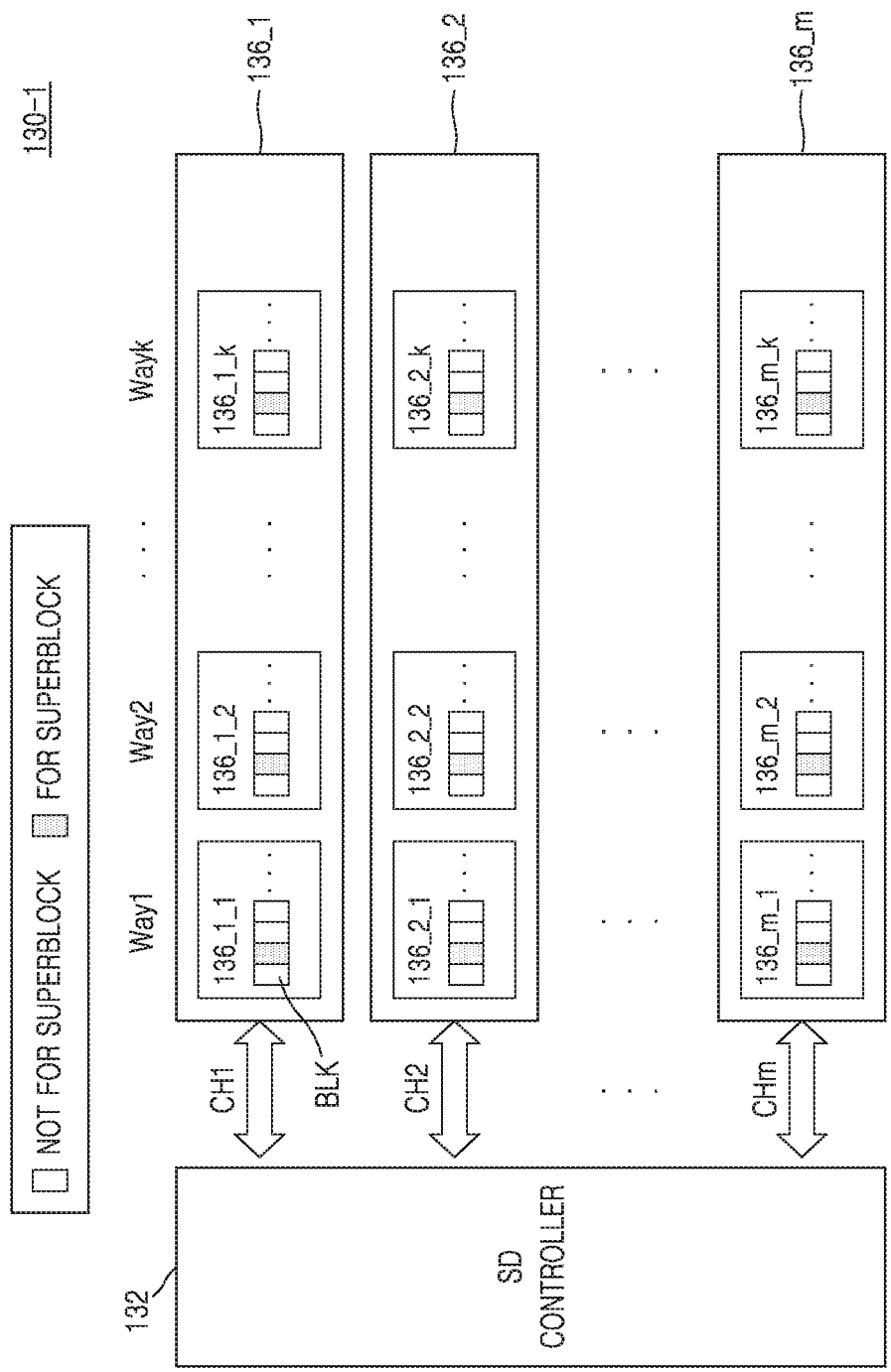

FIGS. 6A and 6B are views illustrating a reset operation of an erase unit size with respect to the storage device 130-1 of FIG. 5.

Referring to FIGS. 6A and 6B, the SD controller 132 may be communicatively connected to the memory chips 136_1 through 136_m of each group through each of the channels CH1 through CHm. Each of the channels CH1 through CHm indicates an independent bus capable of transmitting and receiving a command, an address, and data to/from the memory chips 136_1 through 136_m of each corresponding group. The memory chips 136_1 through 136_m of each of the groups connected to separate channels may be independently operated. The memory chips 136_1 through 136_m of each of the groups connected to separate channels may form a plurality of ways Way1 through Wayk. k memory chips may be respectively connected to the channels CH1 through CHm through the k ways Way1 through Wayk.

A way indicates a unit for dividing memory chips sharing an identical channel Each of the memory chips may be identified according to channel numbers and way numbers. A logical address received from the outside of the storage device 130-1 may determine a memory chip of a certain way of a certain channel (e.g., 136_1_1 through 136_m_k) performing a request provided from the outside (for example, a host) of the storage device 130-1.

Each of the memory chips 136_1 through 136_m of each group may include one or more memory blocks BLK. The one or more memory blocks BLK included in each of the memory chips 136_1 through 136_m may form the super blocks SB (see FIG. 2B). The super blocks SB may be an erase unit size of a device-level.

Referring to FIG. 6A, the super block SB of the storage device 130-1 may be a group of memory blocks BLK included in each of the memory chips in the storage device 130-1. As such, when every memory chip is involved in a configuration of the super blocks SB, the read or write performance of data is improved and an erase unit size of a device-level may be larger compared to when every memory chip is not involved in a configuration of the super blocks SB.

Referring to FIG. 6B, memory chips connected to a way Way1 from among memory chips included in the storage device 130-1 may be involved in a configuration of the super blocks SB. In more detail, the super blocks SB may be a group of memory blocks BLK included in each of the memory chips connected to the way Way1. In an example embodiment, FIG. 6A may be a view when a reset operation of an erase unit size according to the disclosure does not start, and FIG. 6B may be a view when a reset operation of an erase unit size of the storage device 130-1 starts and ends based on an input from the RAID controller 110. In FIG. 6B compared to FIG. 6A, the read or write performance of data of the storage device 130-1 may be reduced but an erase unit size of a device-level may also be reduced.

FIG. 6B illustrates that only the memory chips connected to the way Way1 are involved in a configuration of the super blocks SB to adjust sizes of the super blocks SB. However, the illustrated example embodiment is only for convenience of explanation and the sizes of the super blocks SB may vary according to the number of involved ways. For example, when sizes of the super blocks SB in FIG. 6A are M1, sizes of the super blocks SB in FIG. 6B may be M1/k. Furthermore, sizes of the super blocks SB may be T*(M1/k) when the number of connected ways is T.

Figure 7:
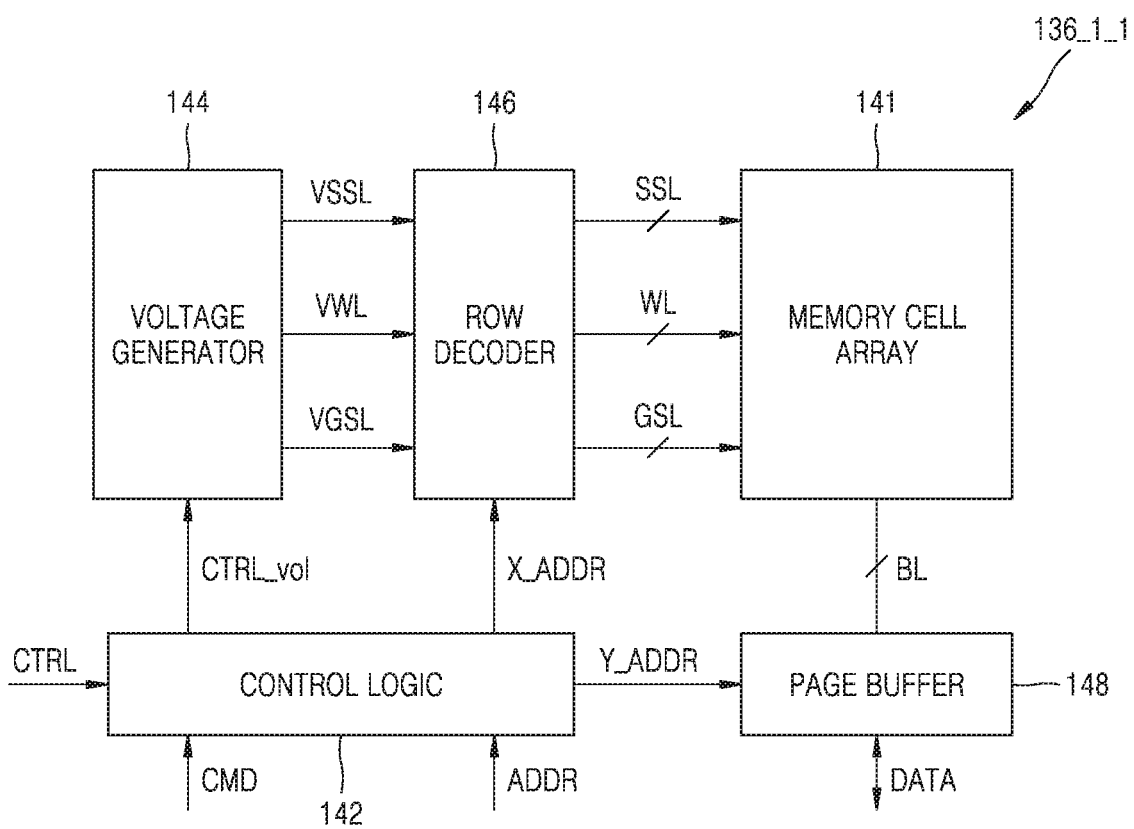
FIG. 7 is a block diagram illustrating a detailed configuration of a memory chip forming the storage device of FIGS. 6A and 6B, according to an example embodiment of the disclosure.

FIG. 7 is a block diagram illustrating a detailed configuration of a memory chip 136_1_1 forming the storage device 130-1 of FIGS. 6A and 6B, according to an example embodiment of the disclosure. Referring to FIG. 7, the memory chip 136_1_1 may include a memory cell array 141, a control logic 142, a voltage generator 144, a row decoder 146, and a page buffer 148.

The memory cell array 141 may be connected to at least one string selection line SSL, a plurality of word lines WL, and at least one ground selection line GSL, and may also be connected to a plurality of bit lines BL. The memory cell array 141 may include a plurality of memory cells (not shown) arranged in areas where the plurality of word lines WL cross the plurality of bit lines BL. The plurality of memory cells (not shown) may include multi-level cells. However, the disclosure is not limited thereto and the plurality of memory cells (not shown) may also include single-level cells.

The control logic 142, based on a command CMD, an address ADDR, and a control signal CTRL received from the SD controller 132 (see FIG. 6), may output various control signals to read/write data from/in the memory cell array 141. Therefore, the control logic 142 may generally control various operations in the memory chip 136_1_1.

Various control signals output from the control logic 142 may be provided to the voltage generator 144, the row decoder 146, and the page buffer 148. In more detail, the control logic 142 may provide the voltage generator 144 with a voltage control signal CTRL_vol, may provide the row decoder 146 with a row address X_ADDR, and may provide the page buffer 148 with a column address Y_ADDR.

The voltage generator 144, based on the voltage control signal CTRL_vol, may generate various voltages to perform program, read, and erase operations on the memory cell array 141. In more detail, the voltage generator 144 may generate a first driving voltage VWL to drive a plurality of word lines WL, a second driving voltage VSSL to drive the plurality of string selection lines SSL, and a third driving voltage VGSL to drive the plurality of ground selection lines GSL.

The row decoder 146 may be connected to the memory cell array 141 through the plurality of word lines WL, and may activate some of the plurality of word lines WL in response to the row address X_ADDR received from the control logic 142. In more detail, during the read operation, the row decoder 146 may apply a read voltage to a selected word line and a pass voltage to an unselected word line. During the program operation, the row decoder 146 may apply a program voltage to a selected word line and a pass voltage to an unselected word line.

The page buffer 148 may be connected to the memory cell array 141 through a plurality of bit lines BL. In more detail, during the read operation, the page buffer 148 may output data, DATA, stored in the memory cell array 141 by being operated as a sense amplifier. During the program operation, the page buffer 148 may input data, DATA, to the memory cell array 141 by being operated as a write driver.

Figure 8:
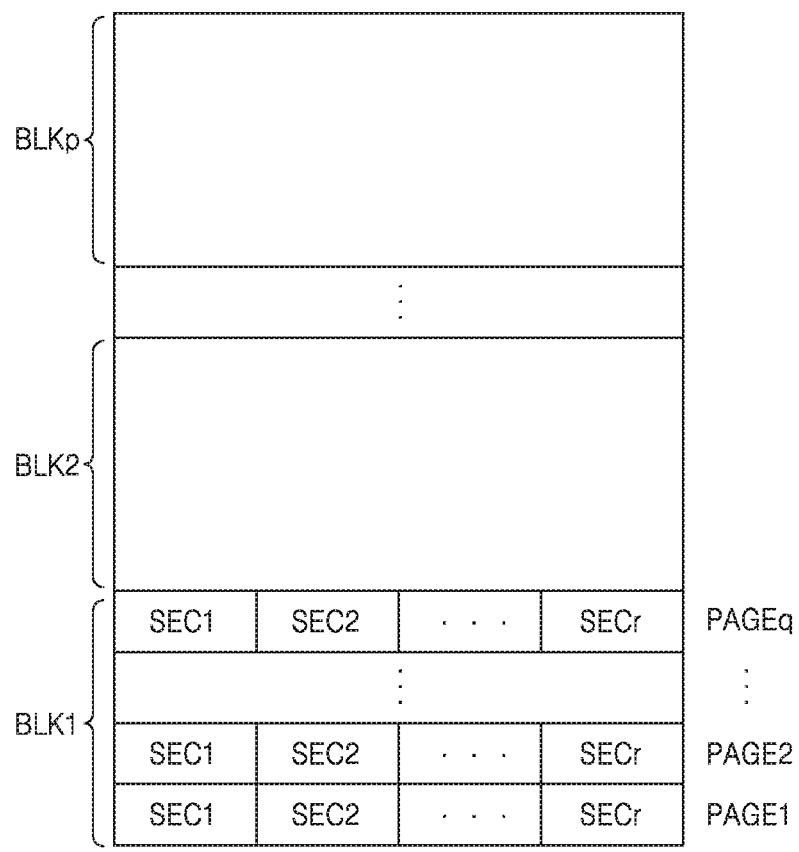
FIG. 8 is a view of a memory cell array of FIG. 7, according to an example embodiment of the disclosure.

FIG. 8 illustrates an example of the memory cell array 141 of FIG. 7, according to an example embodiment of the disclosure.

Figure 9:
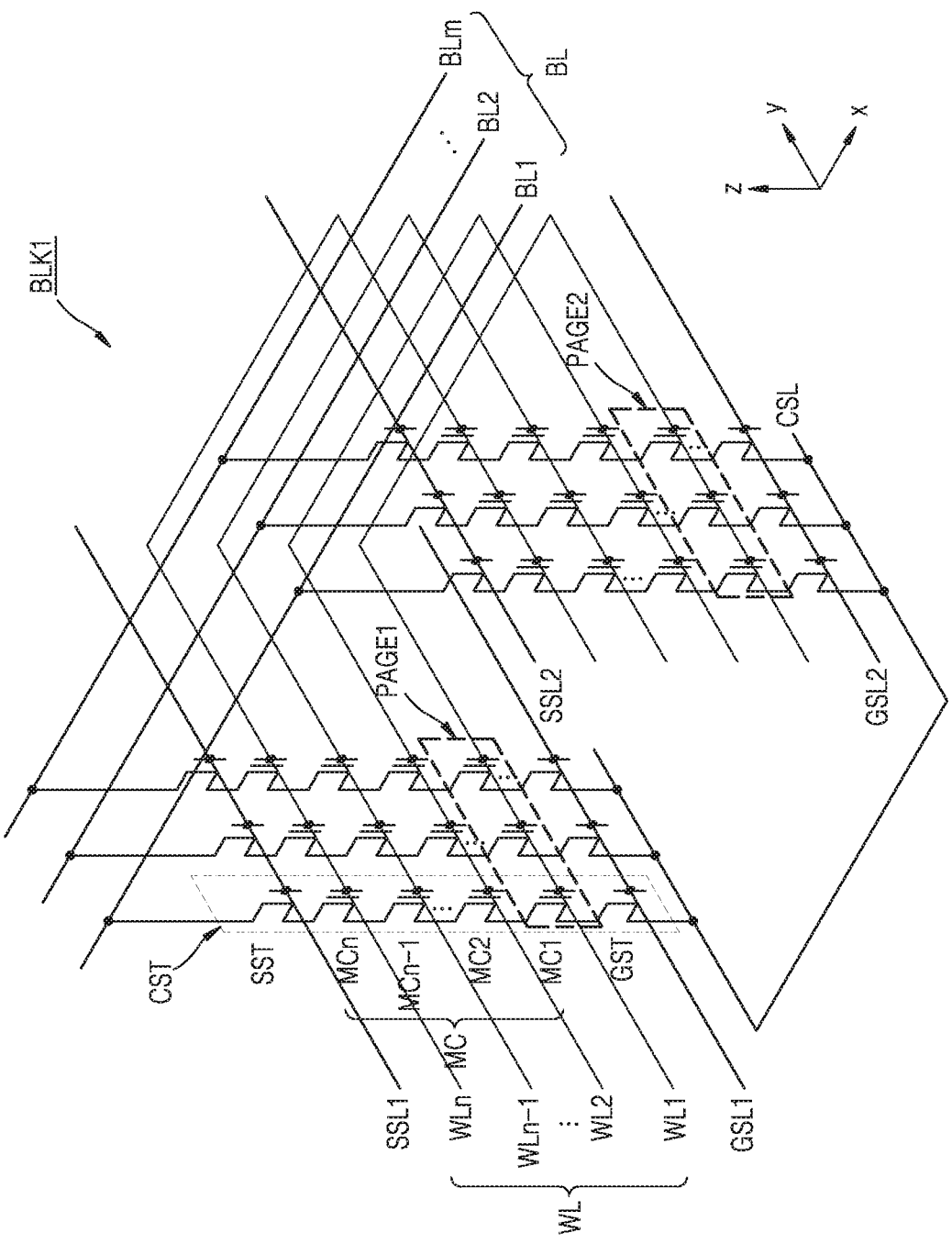
FIG. 9 is a circuit diagram of a first memory block included in the memory cell array of FIG. 8, according to an example embodiment of the disclosure.

Referring to FIG. 8, the memory cell array 141 may be a flash memory cell array. The memory cell array 141 may include p (p is an integer of 2 or more) memory blocks BLK1 through BLKp, each of the memory blocks BLK1 through BLKp may include q (q is an integer of 2 or more) pages PAGE1 through PAGEq, and each of the pages PAGE1 through PAGEq may include r (r is an integer of 2 or more) sectors SEC1 through SECr. FIG. 9 illustrates only the pages PAGE1 through PAGEq and the sectors SEC1 through SECr of the first memory block BLK1 for convenience of illustration. However, the other memory blocks BLK2 through BLKp may also have the same structure as the first memory block BLK1.

FIG. 9 is a circuit diagram of the first memory block BLK1 included in the memory cell array 141 of FIG. 8, according to an example embodiment of the disclosure.

Referring to FIG. 9, the first memory block BLK1 may be a NAND flash memory having a vertical structure. In FIG. 9, a first direction indicates an x-direction, a second direction indicates a y-direction, and a third direction indicates a z-direction. However, the disclosure is not limited thereto and the first to third directions may differ.

The first memory block BLK1 may include a plurality of cell strings CST, a plurality of word lines WL, a plurality of bit lines BL, a plurality of ground selection lines GSL1 and GSL2, a plurality of string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary according to an example embodiment.

Each of the cell strings CST may include a string selection transistor SST, a plurality of memory cells MC, and a ground selection transistor GST that are connected to each other in series between the bit lines BL and the common source line CSL corresponding to each other. In another example embodiment, the cell strings CST may also further include at least one dummy cell. In another example embodiment, the cell strings CST may also include at least two string selection transistors SST or at least two ground selection transistors GST.

The cell strings CST may extend in the third direction z, in more detail, in a vertical direction z on a substrate. Therefore, the first memory block BLK1 including the cell strings CST may be referred to as a NAND flash memory in a vertical direction. As such, integration density of the memory cell array 141 may be improved as the cell strings CST extend in a vertical direction z on a substrate.

The plurality of word lines WL may extend in the first direction x and the second direction y, and each of the word lines WL may be connected to the corresponding memory cell MC. Therefore, the plurality of memory cells MC, which are disposed in a row along the first direction x and the second direction y on an identical layer, may be connected to the same word lines WL, respectively. In more detail, each of the word lines WL may be connected to a gate of each of the memory cells MC and may control each of the memory cells MC. The plurality of memory cells MC may store data and may write, read, or erase the data by being controlled by the connected word lines WL.

The plurality of bit lines BL may extend in the first direction x and may be connected to the string selection transistor SST. Therefore, the plurality of string selection transistors SST disposed in a row along the first direction x may be connected to the same bit lines BL. In more detail, each of the bit lines BL may be connected to a drain of each of the string selection transistors SST.

The plurality of string selection lines SSL1 and SSL2 may extend in the second direction y and may be connected to the string selection transistors SST. Therefore, the plurality of string selection transistors SST disposed in a row along the second direction y may be connected to the same string selection line SSL1 or SSL2. In more detail, the string selection line SSL1 or SSL2 may be connected to a gate of each of the string selection transistors SST and may control each of the string selection transistors SST.

The plurality of ground selection lines GSL1 and GSL2 may extend in the second direction y and may be connected to the ground selection transistors GST. Therefore, the plurality of string selection transistors SST disposed in a row along the second direction y may be connected to the same string selection line SSL1 or SSL2. Therefore, the plurality of ground selection transistors GST disposed in a row along the second direction y may be connected to the same ground selection line GSL1 or GSL2. In more detail, the ground selection line GSL1 or GSL2 may be connected to a gate of each of the ground selection transistors GST and may control the each of the ground selection transistors GST.

Furthermore, each of the ground selection transistors GST included in each of the cell strings CST may be commonly connected to the common source line CSL. In more detail, the common source line CSL may be connected to a source of each of the ground selection transistors GST.

The plurality of memory cells MC commonly connected to the same word line WL and the same string selection line SSL1 or SSL2 and disposed in a row along the second direction y may be referred to as a page. For example, a plurality of memory cells MC commonly connected to the first word line WL1 and the first string selection line SSL1 and disposed in a row along the second direction y may be referred to as a first page PAGE1. For example, a plurality of memory cells MC commonly connected to the first word line WL1 and the second string selection line SSL2 and disposed in a row along the second direction y may be referred to as a second page PAGE2.

To perform a program operation on the memory cells MC, 0V may be applied to the bit lines BL, an ON voltage may be applied to the string selection lines SSL, and an OFF voltage may be applied to the ground selection lines GSL. The ON voltage may be equal to or greater than a threshold voltage of each of the string selection transistors SST to turn on each of the string selection transistors SST, and the OFF voltage may be lower than a threshold voltage of each of the ground selection transistors GST to turn on each of the ground selection transistors GST. Furthermore, a program voltage may be applied to a selected memory cell from among the memory cells MC and a pass voltage may be applied to the other memory cells. When the program voltage is applied, a charge may be injected in the memory cells MC by F-N tunneling. The pass voltage may be greater than a threshold voltage of the memory cells MC.

To perform an erase operation on the memory cells MC, an erase voltage may be applied to a body of the memory cells MC, and 0V may be applied to the word lines WL. Therefore, data of the memory cells MC may be erased at a time.

Figure 10:
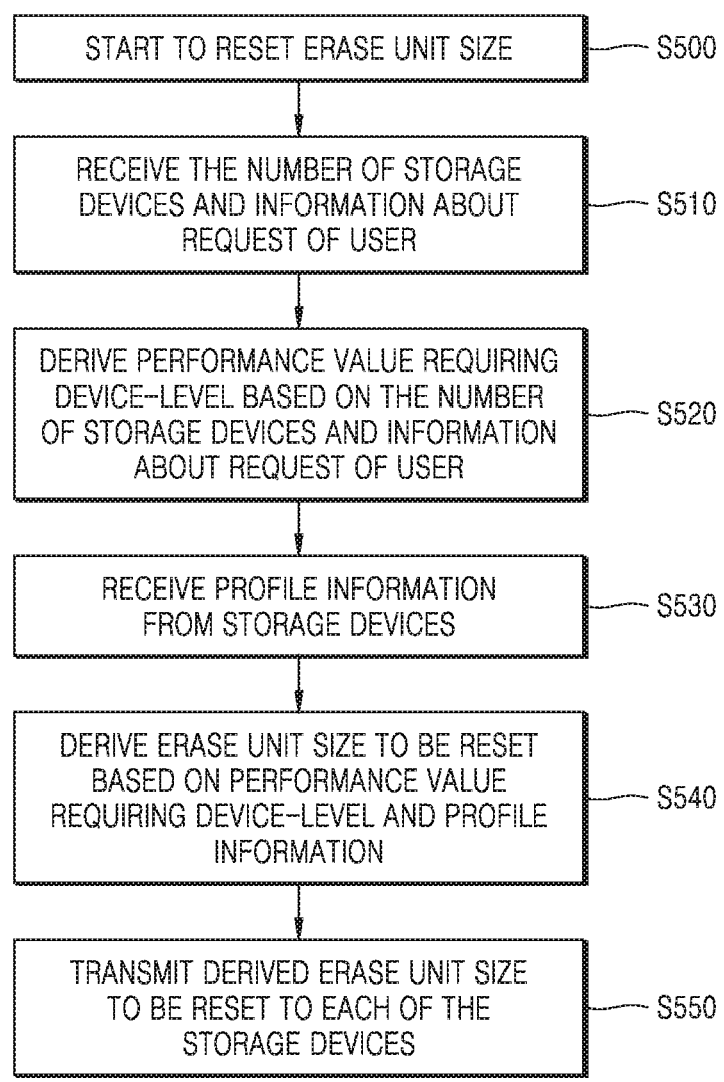
FIG. 10 is a flowchart of an operation of a RAID controller in a RAID storage system, according to an example embodiment of the disclosure.

FIG. 10 is a flowchart of an operation of a RAID controller in a RAID storage system, according to an example embodiment of the disclosure. FIG. 10 illustrates, for example, an operation of the RAID controller 110 included in the RAID storage system 100 of FIG. 1 in a RAID environment to which a log-structured RAID technique is applied.

Referring to FIG. 10, in operation S500, an erase unit size may be reset, and in operation S510, the RAID controller 110 may receive the number of the storage devices 130-1 through 130-n and information about the request of a user. In operation S520, the RAID controller 110 may derive a performance value requiring a device-level based on the number of storage devices 130-1 through 130-n and the information about the request of a user. In an example embodiment, the information about the request of a user may be read or write performance of a RAID-level, and the performance value requiring a device-level may be a value of the read or write performance of the RAID-level divided by the number of storage devices.

In operation S530, after deriving the performance value requiring a device-level, the RAID controller 110 may receive profile information from the storage devices 130-1 through 130-n. In operation S540, the RAID controller 110 may derive an erase unit size to be reset based on the performance value requiring a device-level and the received profile information. In an example embodiment, the received profile information may include correlation information between an erase unit size of a device-level of each of the storage devices 130-1 through 130-n and the read or write performance of a device-level. The RAID controller 110 may derive an erase unit size to be reset according to a minimum value from among erase unit sizes of a device-level according to a correlation with the read or write performance of a device-level, while the read or write performance of the device-level satisfies the performance value requiring a device-level or more.

In operation S550, the RAID controller 110 may transmit the derived erase unit size to be reset to each of the storage devices 130-1 through 130-n.

Figure 11:
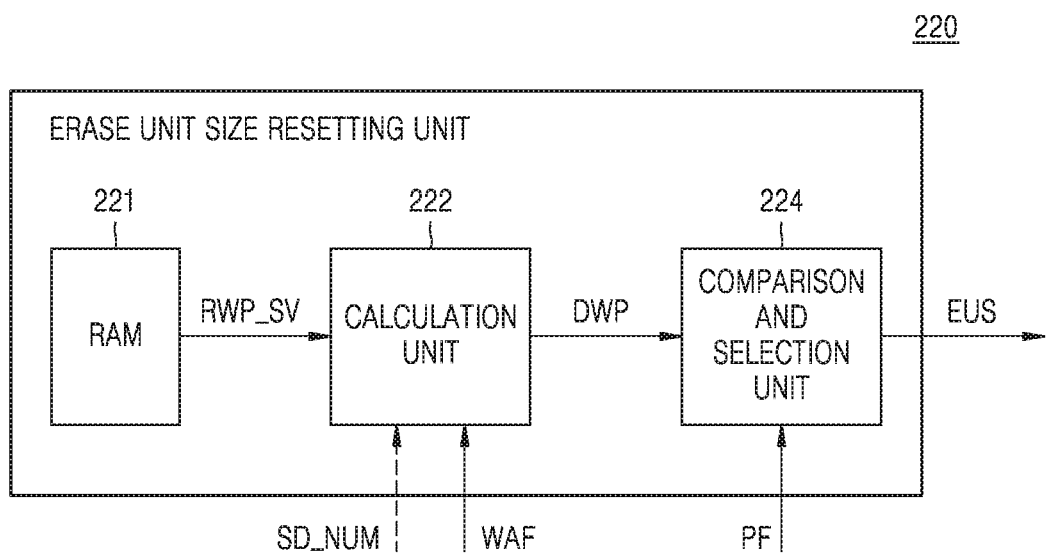
FIG. 11 illustrates another example of a configuration of an erase unit size resetting unit, according to an example embodiment of the disclosure.

FIG. 11 illustrates another example of a configuration of an erase unit size resetting unit, according to an example embodiment of the disclosure. Referring to FIG. 11, an erase unit size resetting unit 220 may include RAM 221, a calculation unit 222, and a comparison and selection unit 224.

Compared to the erase unit size resetting unit 120 of FIG. 3, the erase unit size resetting unit 220 may further include the RAM 221. Operations of the calculation unit 222 and the comparison and selection unit 224 of FIG. 11 are already described above with reference to FIG. 3, and therefore, repeated descriptions thereof will not be given herein.

The RAM 221 may be realized by DRAM or SRAM as a volatile memory. The RAM 221 may store information RWP_SV related to a recent data read or write operation of a RAID storage system. In an example embodiment, the information RWP_SV related to the data read or write operation may be read or write performance of data in a RAID-level. The RAM 221 may provide the calculation unit 222 with the stored information RWP_SV related to the recent data read or write operation in response to a request of, for example, a host (not shown).

The calculation unit 222 may receive the information RWP_SV related to the recent data read or write operation and the number SD_NUM of storage devices (for example, the storage devices 130-1 through 130-$n$ of FIG. 1) and derive the performance value DWP requiring a device-level, and may output the performance value DWP requiring a device-level to the comparison and selection unit 224. In an example embodiment, the calculation unit 222 may derive the performance value DWP requiring a device-level further based on a WAF of a RAID-level as well as the information RWP_SV related to the recent data read or write operation and the number SD_NUM of storage devices.

The comparison and selection unit 224 receives the performance value DWP requiring a device-level from the calculation unit 222 and a profile PF from each of the storage devices, and may select the erase unit size EUS to be reset by comparing the received performance value DWP requiring a device-level with the received profile PF and may output the selected erase unit size EUS to be reset to each of the storage devices. In an example embodiment, the comparison and selection unit 224 may include the erase unit size EUS to be reset in a vendor command, and may output the erase unit size EUS to be reset to each of the storage devices.

Figure 12:
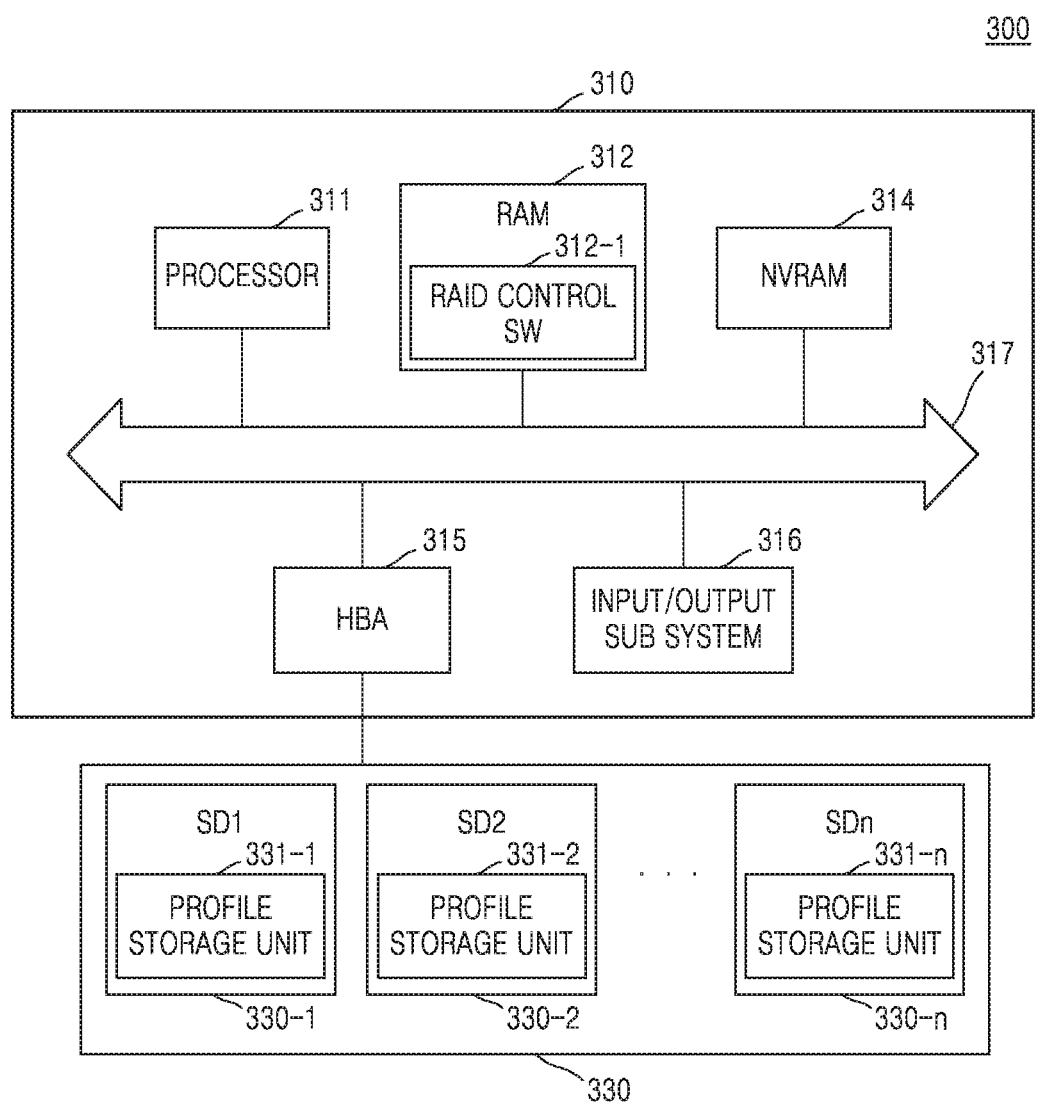
FIG. 12 illustrates another example of a RAID storage system according to an example embodiment of the disclosure.

FIG. 12 illustrates another example of a RAID storage system, according to an example embodiment of the disclosure.

Referring to FIG. 12, a RAID storage system 300 may include a host 310 and an external device 330. The host 310 may include a processor 311, RAM 312, NVRAM 314, a host bus adapter 315, an input/output sub system 316, and a bus 317. The external device 330 may include a plurality of storage devices 330-1 through 330-$n$.

In an example embodiment, the RAID storage system 300 may be a server. In another example embodiment, the RAID storage system 300 may be a personal computer (PC), a set-top box, a digital camera, a navigation device, or a mobile device.

The processor 311 may include circuits, interfaces, or program codes to process data and to control operations of components of the RAID storage system 300. In an example embodiment, the processor 311 may include a central processing unit (CPU), an advanced RISC machine (ARM), or an Application Specific Integrated Circuit (ASIC).

The processor 311 may control operations of the RAID storage system 300 with a log-structured RAID method by using program codes stored in the RAM 312. In an example embodiment, as illustrated in FIG. 10, the processor 311 may control erase unit size resetting of the storage devices 330-1 through 330-$n$ by driving RAID control software 312-1 stored in the RAM 312.

The RAM 312, which is a volatile memory, may include SRAM or DRAM storing data, commands or program codes for operations of the RAID storage system 300. The RAID control software 312-1 may be stored in the RAM 312. The RAID control software 312-1 may include program codes controlling the RAID storage system 300 with a log-structured RAID method. In an example embodiment, the RAID control software 312-1 may include program codes for erase unit size resetting of the storage devices 330-1 through 330-$n$, as illustrated in FIG. 10.

A cache area, in which data to be written in the storage devices 130-1 through 130-$n$ for each stripe unit is stored, may be allocated in the NVRAM 314 that is RAM in which stored data remains even after power is turned off. Since the NVRAM 314 corresponds to the NVRAM 150 of FIG. 1, repeated descriptions thereof will not be given herein.

The host bus adapter 315 may be an adapter connecting the external device 330 to the host 310 of the RAID storage system 300. In an example embodiment, the host bus adapter 315 may include a small computer system interface (SCSI) adapter, a fiber channel adapter, and a serial advanced technology attachment (SATA) adapter. In more detail, the host bus adapter 315 may be directly connected to the storage devices 330-1 through 330-$n$ based on a fiber channel (FC) host bus adapter (HBA). Furthermore, the host bus adapter 315 may be connected to the storage devices 330-1 through 330-$n$ in a storage network area (SAN) environment, and may be an interface between the host 310 and the storage devices 330-1 through 330-$n$.

The input/output sub system 316 may include circuits, interfaces, or codes that are used to exchange information between components of the RAID storage system 300. The input/output sub system 316 may include one or more standardized buses and one or more bus controllers. The input/output sub system 316 may recognize and enumerate devices connected to the bus 317, and may allocate/unallocate resources for the various devices connected to the bus 317. In an example embodiment, the input/output sub system 316 may be a peripheral component interconnect express (PCIe) system, and may include a PCIe root complex, and one or more PCIe switches or bridges.

The storage devices 330-1 through 330-$n$ may store various pieces of data, and may include profile storage units 331-1 through 331-$n$, respectively. Each of the profile storage units 331-1 through 331-$n$ may store a profile of each of the storage devices 330-1 through 330-$n$. The storage devices 330-1 through 330-$n$, in response to a request of the processor 311, may provide a profile of each of the storage devices 330-1 through 330-$n$ stored in the profile storage units 331-1 through 331-$n$ to the processor 311. Each of the storage devices 330-1 through 330-$n$ may reset its erase unit size in response to a reset request of the processor 311.

Figure 13:
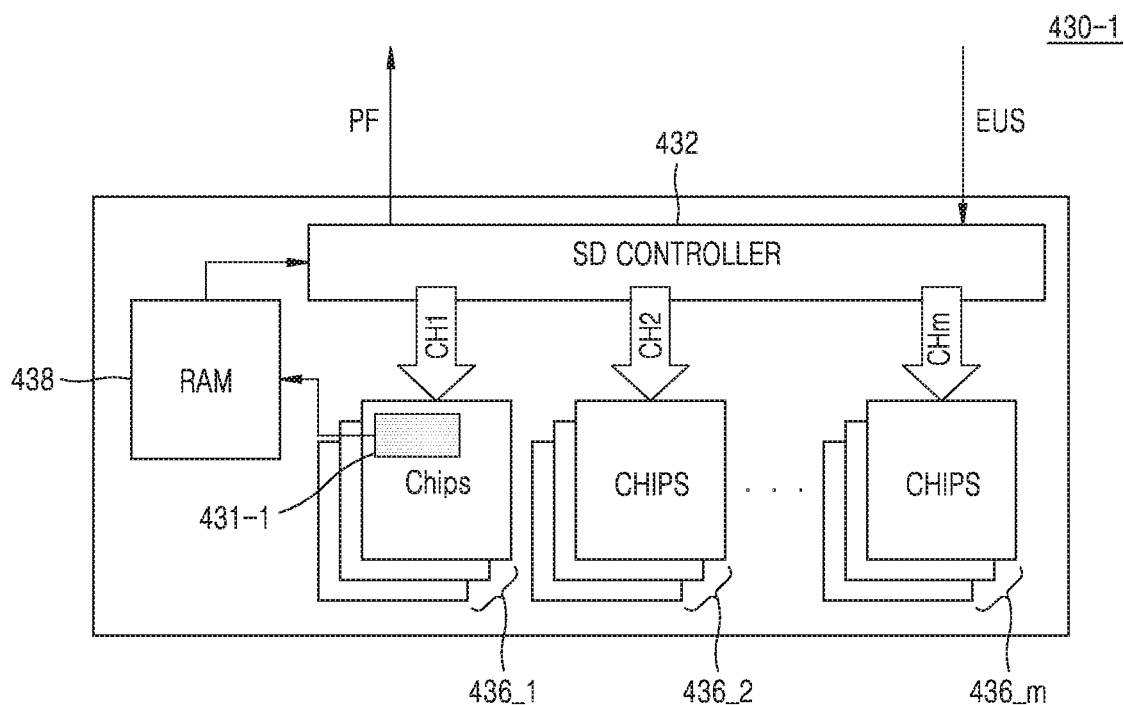
FIG. 13 illustrates another example of a configuration of a storage device, according to an example embodiment of the disclosure.

FIG. 13 illustrates another example of the configuration of the storage devices of FIG. 1, according to an example embodiment of the disclosure.

Referring to FIG. 13, a storage device 430-1 may include an SD controller 432, memory chips 436_1 through 436_$m$ of first through mth groups, and RAM 438. A profile storage unit 431-1 may be included in at least one of the memory chips 436_1 through 436_$m$ of the first through mth groups. A profile PF of the storage device 430-1 may be stored in the profile storage unit 431-1.

Compared to the storage device 130-1 of FIG. 5, the storage device 430-1 may further include the RAM 438. The SD controller 432 and the memory chips 436_1 through 436_$m$ of the first through mth groups of FIG. 13 are already described above with reference to FIG. 5, and therefore, repeated descriptions thereof will not be given herein.

The RAM 438 may be realized by DRAM or SRAM as a volatile memory. The RAM 438 may store the profile PF received from the profile storage unit 431-1 included in at least one memory chip, and may provide the stored profile PF to the SD controller 432 in response to a request of the SD controller 432. The profile PF provided to the SD controller 432 from the RAM 438 may be output to a RAID controller, and may be the basis of a reset operation of an erase unit size of the storage device 430-1.

Figure 14:
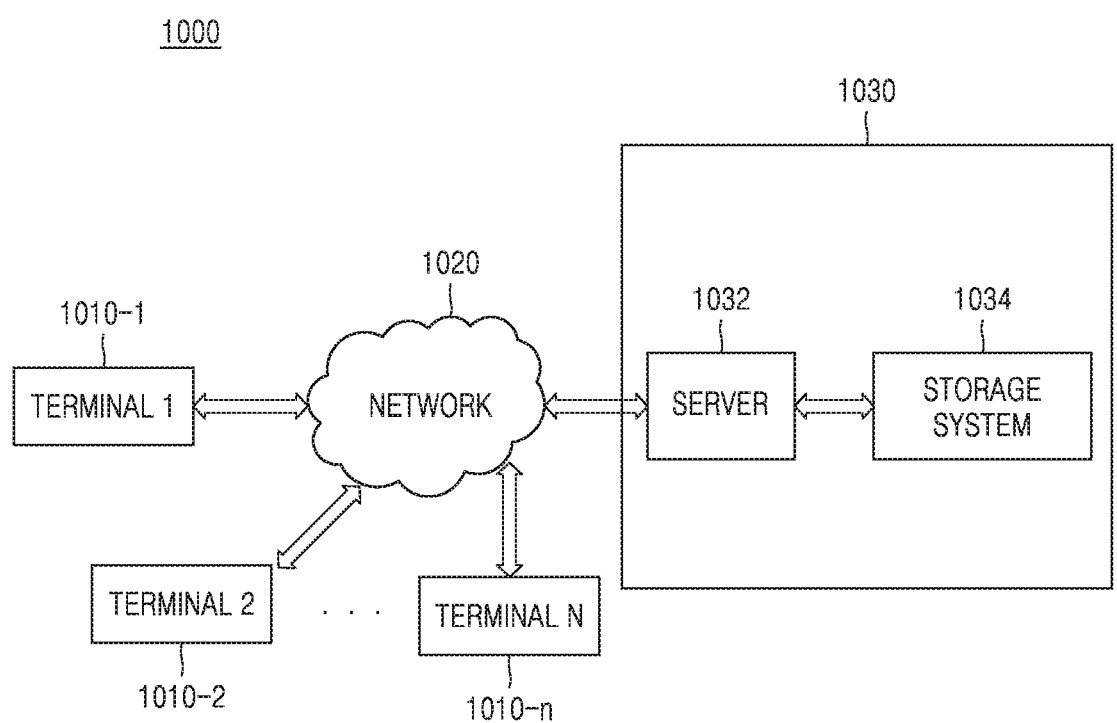
FIG. 14 is a block diagram of a server system and a network system that include a RAID storage system, according to an example embodiment of the disclosure.

FIG. 14 is a block diagram of a server system and a network system that include a RAID storage system, according to an example embodiment of the disclosure.

Referring to FIG. 14, a network system 1000 may include a plurality of terminals 1010-1 through 1010-n and a server system 1030 that are connected to each other through a network 1020. For example, the network system 1000 may represent a search portal or an Internet data center (IDC). Each of the plurality of terminals 1010-1 through 1010-n may be a PC, a laptop computer, a smart phone, a tablet PC, a personal digital assistant (PDA), a mobile internet device (MID), a wearable computer, an Internet of Things (IoT) device, or an Internet of Everything (IoE) device.

The plurality of terminals 1010-1 through 1010-n may communicate with the server system 1030 through the network 1020. The network 1020 may represent a wire network, a wireless network, or an Internet or mobile phone network.

The server system 1030 may include a server 1032 processing requests of the plurality of terminals 1010-1 through 1010-n connected to the network 1020 and a storage system 1034 storing data corresponding to the requests of the plurality of terminals 1010-1 through 1010-n. Here, the storage system 1034 may be a RAID storage system according to the disclosure. Therefore, in a RAID environment, the storage system 1034 may reset an erase unit size in a storage device-level based on at least one of information about the request of a user, profiles of storage devices, and the number of storage devices.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to example embodiments thereof, it will be understood that various changes in form and details may be made therein without departing from the spirit and scope of the following claims.

What is claimed is:

1. A redundant array of independent disks (RAID) storage system comprising:
   a plurality of storage devices configured to perform an erase operation according to each of a plurality of erase unit sizes; and
   a RAID controller configured to control the plurality of storage devices based on a RAID environment, wherein:
   the RAID controller adjusts the erase unit sizes with respect to at least some of the plurality of storage devices, respectively, based upon profile information of the plurality of storage devices that is received from each of the plurality of storage devices, and
   the profile information includes correlation information between an erase unit size and a read or write performance for each of the plurality of storage devices.

2. The RAID storage system of claim 1, wherein the RAID environment, to which a log-structured RAID technique is applied, comprises an erase unit of a storage device-level in an erase unit of a RAID-level.

3. The RAID storage system of claim 1, wherein:
   each of the plurality of storage devices comprises a super block including at least one memory block, and
   the RAID controller adjusts a size of the super block.

4. The RAID storage system of claim 1, wherein the RAID controller respectively adjusts the erase unit sizes with respect to the at least some of the plurality of storage devices based on at least one of information about a request of a user, a profile of each of the storage devices, and a number of storage devices.

5. The RAID storage system of claim 4, wherein the information about the request of a user comprises read or write performance of a RAID-level.

6. The RAID storage system of claim 5, wherein the RAID controller derives a performance value requiring a device-level based on the read or write performance of the RAID-level and the number of storage devices, and respectively adjusts the erase unit sizes with respect to the at least some of the plurality of storage devices based on the performance value requiring the device-level and the correlation information.

7. The RAID storage system of claim 6, wherein the RAID controller respectively adjusts the erase unit sizes with respect to the at least some of the plurality of storage devices according to a minimum value from among the erase unit sizes based on the correlation information while the read or write performance of the device-level satisfies the performance value requiring the device-level or more.

8. The RAID storage system of claim 6, wherein the performance value requiring the device-level is a value of the read or write performance of the RAID-level divided by the number of storage devices.

9. The RAID storage system of claim 6, wherein the RAID controller derives the performance value requiring the device-level further based on a write amplification factor (WAF) of the RAID-level.

10. The RAID storage system of claim 9, wherein the performance value requiring the device-level is a value obtained by multiplying the read or write performance of the RAID-level divided by the number of storage devices by the WAF of the RAID-level.

11. A storage device controlled by a redundant array of independent disks (RAID) controller, the storage device comprising:

a device controller; and a plurality of memory devices connected to the device controller through at least one channel, wherein the device controller resets an erase unit size of the storage device according to an input from the RAID controller, the storage device stores profile information of the storage device and provides the profile information to the RAID controller in response to a request of the RAID controller, and the profile information is correlation information between the erase unit size of the storage device and a read or write performance of the storage device.

12. The storage device of claim 11, wherein the storage device comprises the profile information in a vendor command and provides the information about the profile to the RAID controller.

13. The storage device of claim 11, wherein the storage device comprises a plurality of solid state drives.

14. A redundant array of independent disks (RAID) storage system comprising:

a plurality of storage devices that erase an amount of stored data identified by a received erase-unit size; and a RAID controller that determines the erase-unit size based upon profile information of the storage devices, which is received from each of the storage devices, and communicates the erase-unit size to the storage devices, and the profile information includes correlation information between an erase unit size and a read or write performance for each of the storage devices.

15. The RAID storage system of claim 14, wherein the profile information identifies a write-throughput speed of the storage devices.

16. The RAID storage system of claim 14, wherein the RAID controller further determines the erase-unit size based upon a number of the storage devices receiving the erase-unit size.

17. The RAID storage system of claim 14, wherein the RAID controller further determines the erase-unit size based upon read or write performance information that is received from an external host device.

18. The RAID storage system of claim 14, wherein the RAID controller further determines the erase-unit size based upon a write-amplification factor applied to the storage devices.

* * * * *